United States Patent [19]

Taft

[11] 4,214,775
[45] Jul. 29, 1980

[54] SUSPENSION ASSEMBLIES FOR VEHICLES

[75] Inventor: Philip A. Taft, Solihull, England

[73] Assignee: Girling Limited, Birmingham, England

[21] Appl. No.: 946,583

[22] Filed: Sep. 28, 1978

[30] Foreign Application Priority Data

Oct. 8, 1977 [GB] United Kingdom ............... 41990/77

[51] Int. Cl.$^2$ ............................................. B60G 11/30
[52] U.S. Cl. ................................. 280/708; 267/64 R
[58] Field of Search ........... 280/708; 267/64 R, 65 R, 267/65 D

[56] References Cited

U.S. PATENT DOCUMENTS

| | | | |
|---|---|---|---|
| 3,088,726 | 5/1963 | Dangauthier | 280/708 |
| 3,941,403 | 3/1976 | Hiruma | 267/65 D |

*Primary Examiner*—John J. Love
*Assistant Examiner*—John A. Carroll
*Attorney, Agent, or Firm*—Scrivener, Parker, Scrivener and Clarke

[57] ABSTRACT

An hydro-pneumatic suspension assembly for vehicles comprises a pressure chamber in a combination with an hydraulic suspension unit of the self-levelling type. The unit incorporates a spool valve for maintaining the length of the unit at a predetermined value irrespective of the load. The spool valve is responsive to the position of a piston rod which carries the piston of the unit, and a damper, comprising a restricted passage, is incorporated to delay the response of the spool valve to movement of an assembly comprising the piston and the piston rod.

4 Claims, 4 Drawing Figures

SUSPENSION ASSEMBLIES FOR VEHICLES

This invention relates to an hydro-pneumatic suspension assembly for vehicles, the suspension assembly being of the kind comprising an hydraulic suspension unit of the self-levelling type in combination with a pressure chamber containing air or other gas for supporting the load on a wheel, in which the unit comprises a cylinder in communication with the pressure chamber, a closure for one end of the cylinder, a piston rod assembly comprising a piston adapted to work in the cylinder, and a piston-rod carrying the piston and adapted to work through the closure, an inlet port for connection to a source of high pressure liquid, an outlet port for connection to a reservoir for liquid, and a spool valve responsive to the position of the piston rod assembly for controlling communication between the inlet port and the pressure chamber and between the pressure chamber and the outlet port to maintain the length of the unit at a predetermined value irrespective of the load.

In a hydro-pneumatic suspension assembly of the kind set forth the pressure chamber may be combined with the cylinder or it may comprise a separate assembly connected to the unit by an external connection.

In known suspension assemblies of the kind set forth difficulty is experienced in ensuring that the spool valve operates to alter the effective length of the unit only in response to a genuine change in the loading of a vehicle in which it is incorporated, as opposed to a temporary weight transfer from one wheel to another such as occurs when the vehicle is negotiating a tight curve in one direction, for example a roundabout or traffic island, or in response to excessive oscillations of the unit.

According to our invention in an hydro-pneumatic suspension assembly of the kind set forth a damping means is incorporated to delay the response of the spool valve to movement of the rod assembly.

The spool valve reciprocates in response to oscillation of the rod assembly and the damping means in constructed and arranged to delay the response of the spool valve, so that even a maximum oscillations, the spool valve does not travel sufficiently to place the inlet port or the outlet port in communication with the pressure chamber. This ensures that the inlet port and outlet port can open only in response to a genuine change in the loading which is operative to displace the spool valve position against the effect of the damping means.

The damping means may comprise a restricted passage through which liquid has to be pumped before the spool valve can be displaced by a distance sufficient to open or expose one of the ports.

Conveniently the restricted passage is provided in a plate which preferably is located between the spool valve and the pressure chamber, that is to say at the free end of the spool which is remote from the end closure. This actual displacement of the spool valve to open either port is restricted by the work which had to be done in forcing liquid through the restricted passage before the spool can itself be displaced by the necessary axial distance to open the port.

Operation of the spool valve may be controlled by an axial rod which carries the spool at one end, the opposite end of the rod having spaced abutments which engage with retainers for opposite ends of a spring which is housed within the piston rod and which is caged when the spool is in a mid or neutral position in which both ports are closed, extension of the unit from the mid or neutral position uncaging the end of the spring which is adjacent to the spool so that the spool can be moved by the rod in a corresponding direction to open the outlet port in the event of a decrease in loading, and contraction of the unit from the mid or neutral position uncaging the end of the spring remote from the spool so that the spool can be moved by the rod in a corresponding direction to open the inlet port in the event of an increase in loading.

One embodiment of our invention is illustrated in the accompanying drawings in which.

Figure 1:
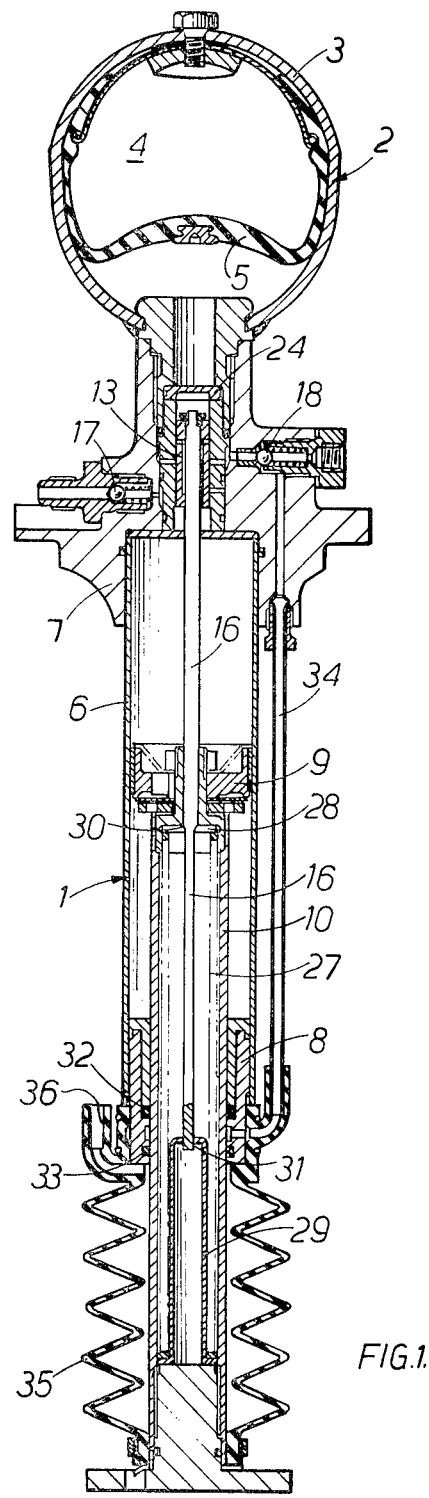
FIG. 1 is a longitudinal section through an hydropneumatic suspension assembly for vehicles.
Figure 2:
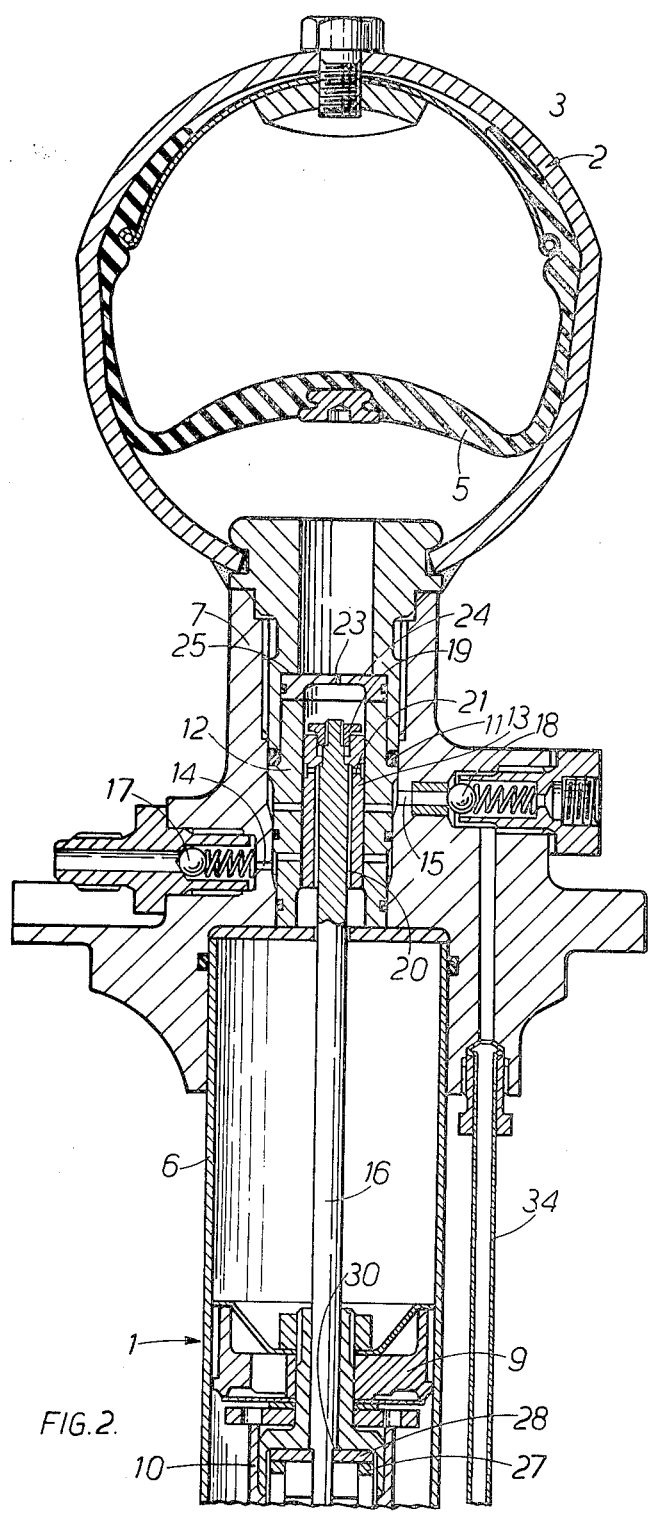
FIG. 2 is a section on an enlarged scale of the valve mechanism incorporated in the suspension assembly of FIG. 1.

The hydro-pneumatic suspension assembly illustrated in the drawings comprises an hydraulic suspension unit 1 of the self-levelling type at one end of which is mounted a pressure chamber 2.

The pressure chamber 2 comprises a casing 3 containing a volume 4 of gas or air to support the load on a wheel and which is separated from the unit 1 by a distentable membrane 5.

The unit 1 comprises a cylinder 6 of which the upper end is connected to a housing 7 which, in turn, is connected to the casing 3, and a closure 8 closes the lower end of the cylinder 6. A piston 9 provided with a one-way valve or restriction of known construction works in the cylinder 6 and the piston 9 is carried by a hollow piston rod 10 with which it forms an assembly and which works through the closure 8.

The housing 7 is provided with an axial bore 11 which accommodates a sleeve 12, and a valve spool 13 works in the sleeve 12 to control communication between an inlet port 14 for connection to a source of hydraulic fluid under pressure, for example an hydraulic accumulator, and the cylinder 6, and between cylinder 6 and an outlet port 15 for connection to a reservoir for fluid. An axially extending rod 16 carries the spool 13 at its upper end and at its lower end projects through the piston 9 and into the piston rod 10.

The source of pressure is supplied to the inlet port 14 through a one-way valve, and a second one-way valve 18 is disposed in an outlet connection to the reservoir from the port 15.

When the spool 13 is in a mid or neutral position it closes both inlet and outlet ports 14 and 15.

The upper end of the rod 16 is rigidly secured to the spool 13 by means of a screwed connection 19.

Figure 3:
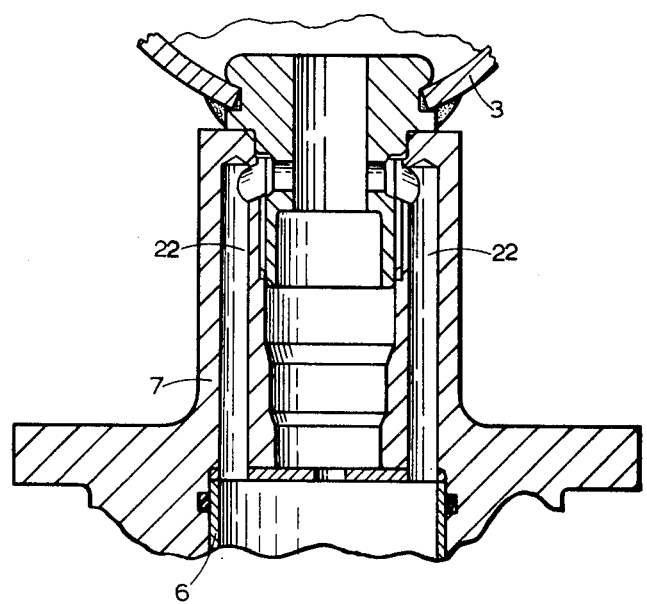
FIG. 3 is a section on an enlarged scale of a portion of the suspension assembly with the valve mechanism omitted for clarity and the section displaced around the axis by 90° with respect to the section of FIG. 1.

An annular passage 20 open at its lower end is defined between the spool 13 and the rod 16 to provide communication between the cylinder and radial ports 21 in the spool 13 adjacent to the connection 17. Axial passages 22 (see FIG. 3) provided in the housing 7 interconnect opposite ends of the spool valve so that fluid in the cylinder 6 above the piston is at the same pressure as that in the casing 3 below the membrane 5.

Damping means are located between the spool 21 and the pressure chamber 2. The damping means comprise a restricted passage 23 in a plate 24 which is clamped by the sleeve 12 against a shoulder 25.

A compression spring 27 housed within the piston rod 10 is caged at opposite ends between a pair of retainers 28 and 29. The upper retainer 28 comprises a plate which is normally in abutment with a shoulder 30 at an intermediate point in the length of the rod 16 and the lower retainer 29 comprises a metal pressing of top-hat outline and of substantial axial length on which the lower free end of the rod 16 acts through an abutment collar 31.

The piston rod 10 works through a pair of seals 32 and 33 in the closure 8 and the innermost seal 32, which is subjected to high pressure, is of the low pressure type, permitting a slight leakage. Any leakage of liquid is retauned to the reservoir through an external connection 34 on the downstream side of the one-way valve 18.

The end of the piston rod 10 which projects from the cylinder 6 is enclosed within a sealing boot 35 of which the interior can be connected through a union 36 to the reservoir above the level of liquid which it contains. This has the advantage that the interior of the boot 35 is lubricated by oily air, to prevent corrosion of the piston rod 10.

The assembly is connected between the chassis of a vehicle and a wheel. The weight acting on the wheel of a vehicle is supported by the volume of air/gas in the pressure chamber 2 which is pressurised by liquid in the unit 1, and the unit 1 is maintained at a predetermined length, irrespective of the loading on the wheel, by operation of the spool valve.

When the loading is constant the inlet and outlet ports 14 and 15 are closed by the spool 13, the spring 27 is caged, and the pressure of fluid in the unit 1 acts over the rod 16.

When the vehicle is in motion oscillation of the wheel causes the piston 9 to reciprocate in the cylinder 6 and such movement is damped by the work done on the liquid in forcing it in both directions through the one-way valves or restrictors in the piston 9. The rod 16 cycles with the piston 9 and the piston rod 10. This, in turn, reciprocates the spool 13 but the restrictor 23 delays the response of the spool 13 so that even at maximum oscillation of the rod 16, without a change in the load, the spool 13 is not displaced from a means or neutral position by a distance sufficient to open either the inlet port 14 or the outlet port 15.

Should the vehicle be unloaded and the load on that wheel decrease, the unit 1 will extend. After the delay has been overcome, the lower end of the spring 27 is uncaged and the spool 13 moves towards the end of the unit remote from the pressure chamber 2 to bring the ports 21 into alignment with the outlet port 15. Liquid is then returned to the reservoir to reduce the effective length of the unit until the spring 27 is again caged, which determines the length of the unit. Should the vehicle be in motion immediately after a reduction in loading has taken place, the unit will cycle about its extended means length with the spool 13 displaced from its neutral or mid position until the length of the unit has been reduced as described above.

Should the load on the wheel be increased, the converse of the sequence described above occurs, namely that the unit contracts with the upper end of the spring 27 becoming uncaged and the spool 13 moving upwardly to expose the inlet port 14 so that additional high pressure fluid is admitted to the unit.

The top-hat shape of the retainer 19 is chosen to accommodate relative axial movement of the rod 16 when the unit contracts, without increasing the effective length of the unit.

The provision of the one-way valves 17 and 18, which are spring-loaded, ensures that upon failure of the pressure source sufficient pressure fluid is trapped in the unit for the unit to continue to act as a damper.

Figure 4:
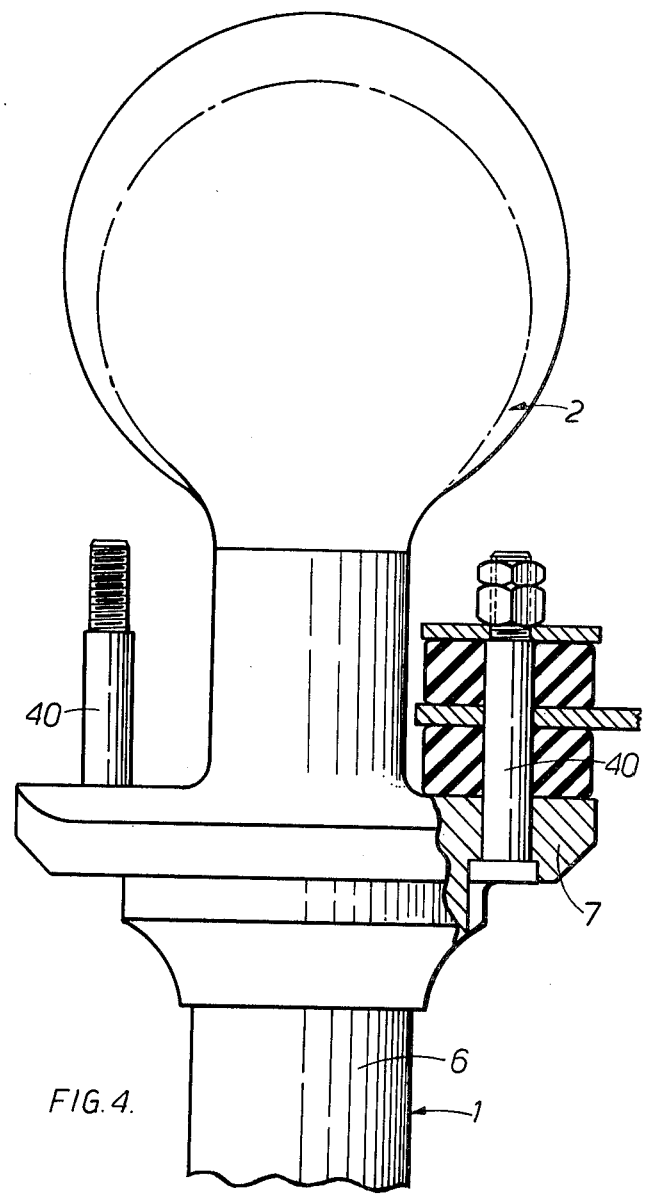
FIG. 4 is a view of a practical mounting for the end of the assembly which incorporates the pressure chamber.

When the assembly is installed in a vehicle it is desirable, as shown in FIG. 4, to connect the upper end of the cylinder 6 to the vehicle through the housing 7 by means of a pair of diametrically arranged bolts 40. This prevents the weight being taken by the casing 3 which is undesirable since it comprises a pressure vessel. In such a construction an axis passing through the bolts 40 is parallel to the longitudinal axis of the vehicle to provide rigidity in the direction of travel of the vehicle but to allow the unit to move radially in response to suspension movements.

The assembly described above is designed to support the load on a wheel on its own. However, it may be used in conjunction with a coil spring encircling the cylinder 6 and abutting between thrust taking portions on the housing 7 and at the lower free end of the piston rod 10.

What is claimed is:

1. A vehicle hydro-pneumatic suspension assembly comprising an hydraulic suspension unit of the self-levelling type in combination with a pressure chamber containing air or other gas for supporting the load on a wheel, wherein said unit comprises a cylinder in communication with said pressure chamber, a closure for one end of said cylinder, a piston rod assembly comprising a piston adapted to work in said cylinder, and a piston-rod carrying said piston and adapted to work through said closure, an inlet port for connection to a source of high pressure liquid, an outlet port for connection to a reservoir for liquid, a spool valve responsive to the position of said piston rod assembly for controlling communication between said inlet port and said pressure chamber and between said pressure chamber and said outlet port to maintain the length of the unit at a predetermined value irrespective of the load, and damping means to delay response of said spool valve to movement of said rod assembly, wherein said spool valve comprises a spool, and said cylinder has a bore in which said spool works, and wherein an axial rod located in said cylinder has a first end which carries said spool and a second end, spaced abutments being provided at said second end of said axial rod and at an end of said piston rod remote from said piston, retainers being located in abutment with said abutments, and a spring housed within said piston rod being engaged at opposite ends between said retainers, said spring being caged when said spool is in a neutral position in which both said ports are closed, extension of the unit from said neutral position uncaging the end of said spring which is adjacent to said spool so that said spool can be moved by said axial rod in a corresponding direction to open said outlet port in the event of a decrease in loading, and contraction of said unit from said neutral position uncaging the end of said spring remote from said spool so that said spool can be moved by said axial rod in a corresponding direction to open said inlet port in the event of an increase in loading.

2. An assembly as claimed in claim 1, wherein said damping means comprises a restricted passage through which liquid has to be pumped before said spool valve can be displaced by a distance to expose one of said ports.

3. An assembly as claimed in claim 2, wherein said restricted passage is located between said spool valve and said pressure chamber.

4. An assembly as claimed in claim 2, wherein said restricted passage is provided in a plate.

* * * * *